US009703992B2

(12) United States Patent
Gustafsson et al.

(10) Patent No.: US 9,703,992 B2
(45) Date of Patent: Jul. 11, 2017

(54) DUAL CARD READER FOR MOBILE DEVICE (71) Applicant: iZettle Merchant Services AB, Stockholm (SE)

(72) Inventors: Olle Gustafsson, Stockholm (SE); Peder Stahle, Stockholm (SE)

(73) Assignee: iZettle Merchant Services AB, Stockholm (SE)

( * ) Notice: Subject to any disclaimer, the term of this patent is extended or adjusted under 35 U.S.C. 154(b) by 0 days.

(21) Appl. No.: 14/651,699

(22) PCT Filed: Dec. 12, 2012

(86) PCT No.: PCT/SE2012/051380
§ 371 (c)(1),
(2) Date: Jun. 12, 2015

(87) PCT Pub. No.: WO2014/092615
PCT Pub. Date: Jun. 19, 2014

(65) Prior Publication Data
US 2015/0317498 A1    Nov. 5, 2015

(51) Int. Cl.
*G06K 7/00*    (2006.01)
*G06K 7/08*    (2006.01)
(Continued)

(52) U.S. Cl.
CPC .......... *G06K 7/0004* (2013.01); *G06K 7/006* (2013.01); *G06K 7/084* (2013.01); *G06Q 20/32* (2013.01);
(Continued)

(58) Field of Classification Search
CPC .... G06Q 20/34; G06Q 20/3223; G06Q 20/16; G06K 7/0004; G06K 7/0026; G06K 19/067; G06K 19/044
(Continued)

(56) References Cited

U.S. PATENT DOCUMENTS 5,811,770 A * 9/1998 Bonnemoy .......... G06Q 20/341
                                                235/380
6,169,975 B1 * 1/2001 White ................... G06K 7/084
                                                235/381
(Continued)

FOREIGN PATENT DOCUMENTS

CN    102598046 A      7/2012
FR    EP 0959424 A1 * 11/1999  .......... G06K 7/0004
(Continued)

OTHER PUBLICATIONS

International Search Report for corresponding patent application No. PCT/SE2012/051380 dated Nov. 27, 2013.
(Continued)

*Primary Examiner* — Claude J Brown
(74) *Attorney, Agent, or Firm* — Renner, Otto, Boisselle & Sklar, LLP (57) ABSTRACT

A card reader for use with a mobile phone includes a flat body having an upper side, a lower side and at least one side wall, a connector for connecting the card reader to a mobile phone, a chip card reader, including an elongated opening in a side wall of the card reader, adapted to read a chip card, positioned in a first plane, in the opening; and a magnet stripe reader including a slot in a side wall of the card reader, the slot being adapted to read a magnet stripe slid in the slot along a second plane; wherein the first plane and the second plane intersect.

19 Claims, 6 Drawing Sheets (51) Int. Cl.
  *G06Q 20/32* (2012.01)
  *G07F 7/08* (2006.01)
  *G07F 7/10* (2006.01)
  *H04M 1/725* (2006.01)
(52) U.S. Cl.
  CPC .......... *G07F 7/0873* (2013.01); *G07F 7/1033* (2013.01); *H04M 1/72527* (2013.01)
(58) Field of Classification Search
  USPC ........................................................ 235/440
  See application file for complete search history.

(56) References Cited

U.S. PATENT DOCUMENTS

| | | | | |
|---|---|---|---|---|
| 2004/0104268 A1* | 6/2004 | Bailey | ................... | G06Q 20/32 235/439 |
| 2005/0236480 A1* | 10/2005 | Vrotsos | ................ | G06Q 20/341 235/439 |
| 2008/0011850 A1* | 1/2008 | Henry | .................. | G06K 7/0004 235/441 |
| 2011/0084131 A1 | 4/2011 | McKelvey | | |
| 2011/0270741 A1 | 11/2011 | Kayser et al. | | |
| 2013/0343575 A1* | 12/2013 | Lu | ........................... | H04R 3/00 381/111 |

FOREIGN PATENT DOCUMENTS

| | | |
|---|---|---|
| WO | 0137229 A1 | 5/2001 |
| WO | 2005104428 A2 | 11/2005 |
| WO | 2010024923 A1 | 3/2010 |
| WO | 2012003892 A1 | 1/2012 |

OTHER PUBLICATIONS

Office Action for corresponding Chinese Patent Application No. 201280077611.5 dated Dec. 12, 2016.

* cited by examiner

Fig. 5b

DUAL CARD READER FOR MOBILE DEVICE

This application is a national phase of International Application No. PCT/SE2012/051380 filed Dec. 12, 2012 and published in the English language.

TECHNICAL FIELD

The invention relates in general to the field of electronic card readers, and more particularly, to a dual card reader for making secure credit card payments using a mobile device, such as a mobile phone.

BACKGROUND

Every day an incredible number of credit card payments are made around the world, and the number of payments are steadily increasing. The majority of credit card payments are either made in stores using a point-of-sale, POS, terminal where you insert or swipe your credit card and identify yourself with a personal identification number, PIN, or on the Internet using a computer where you enter your credit card details and in some cases also a security code.

A much safer and easier way to make payments would be to own your own POS terminal, by which you could make all your transactions. Unfortunately, a POS terminal is very expensive to purchase and use and you have to pay a fee for each transaction. It is also too bulky to carry around with you, so in reality only a place of business can afford owning one. Therefore, a small card reader, for attachment to the user's mobile phone, is in many cases an attractive alternative. Card readers for attachment to a mobile phone are today commonly known e.g. WO 2012/003892. Those devices can be made very small, and are thereby easy to bring in your pocket.

However, the card readers for attachment to a mobile phone on the market today, support either a chip card i.e. a card with embedded integrated circuits, or a magnet stripe i.e. a card comprising a magnet stripe holding information such as account number, name of user, country code, encrypted PIN etc. However, due to different requirements on different markets it may be desirable to provide a card reader supporting both card types. In POS terminals it is commonly known to have support for both chip card and magnet stripe. Such a device comprises a chip card reader positioned e.g. on the top or at the front of the POS terminal and a magnet stripe reader e.g. embodied as a slot in the upper side of the terminal. The design of those devices is very bulky and not suitable for a carrying around and could therefore not be readily integrated in a card reader for attachment to a mobile phone.

Hence, it would be desirable to provide a dual card reader for attachment to a mobile phone, which supports both chip cards and magnet stripe cards, still being neat and easy to carry around. Furthermore, such a device need to be robust and durable, in order not to break, when kept e.g. in a pocket. A further requirement on such device is that it is easy to use. Attractive design, such as a minimal thickness and a width smaller than the size of the mobile phone is also favorable.

A further problem with existing devices is also that they comprise an internal battery or rely on power from the mobile phone to which they are attached. However, this may be a problem, because when the card reader runs out of power, it cannot be recharged instantly or the card reader will drain the battery of the mobile phone. Hence, a further objective of one embodiment of the invention is be to provide a card reader comprising an exchangeable battery, still fulfilling the requirements mentioned above.

SUMMARY

With the above description in mind, then, an aspect of the present invention is to provide an a dual card reader for attachment to a mobile phone which seeks to mitigate, alleviate, or eliminate one or more of the above-identified deficiencies in the art and disadvantages singly or in any combination.

The present invention is defined by the appended independent claims. Various advantageous embodiments of the invention are set forth by the appended dependent claims as well as by the following description and the accompanying drawings.

According to one aspect of the invention, it provides for card reader for use with a mobile phone comprising, a flat body comprising an upper side, a lower side and at least one side wall, a connector for connecting the card reader to a mobile phone, a chip card reader, comprising an elongated opening in a side wall of said card reader, adapted to read a chip card, positioned in a first plane, in said opening; and a magnet stripe reader comprising a slot in a side wall of the card reader, said slot being adapted to read a magnet stripe slid in the slot along a second plane; wherein the first plane and the second plane intersects.

By placing the card readers are positioned in the side wall of the body, a robust design is achieved, because the openings of the card readers are positioned in the side wall(s) of the device. Hence, protrusive parts are avoided.

By positioning the chip card reader and the magnet stripe reader in two planes that intersect, the device may be made flat, because the magnet stripe reader head, which is a bulky component may positioned where the distance between the planes is utmost.

By angling the magnet stripe reader positioned in the side wall, it is possible to swipe a card, even when the body lies on a surface.

According to one aspect of the invention, the upper side of the card reader is curved, thereby the volume of the card reader is minimised.

According to one aspect of the invention, the connector is positioned on a side wall of said card reader and the elongated opening of said chip card reader and the slot of the magnet stripe reader are positioned on the opposite side of the card reader.

By positioning the magnet stripe reader in the opposite side of the card reader, the user can swipe his card even if dimensions of the card reader are less than the dimensions of the mobile phone.

According to one aspect of the invention, the elongated opening of the chip card reader and the slot of the magnet stripe reader are positioned on top of each other. This placement provides for an even more compact design.

According to one aspect of the invention, the magnet stripe reader further comprises a magnet stripe reader head positioned between the chip card reader and the magnet stripe reader.

According to one aspect of the invention battery the card reader further comprises a battery being exchangeable through an opening in the card reader.

According to one aspect of the invention the thinnest part of the card reader is positioned between the magnet stripe reader head and the battery.

With the above and following description in mind, an aspect of certain embodiments of the present invention is to provide a card reader in which the above-mentioned drawbacks can be overcome.

With the above description in mind, the object of the present invention is to overcome at least some of the disadvantages of known technology as described previously.

BRIEF DESCRIPTION OF THE DRAWINGS

Further objects and features, of the present invention will appear from the following detailed description of some embodiments/aspects of the invention, wherein some embodiments/aspects of the invention will be described in more detail with reference to the accompanying drawings, in which: The present invention will be more readily understood through the study of the following detailed description of the embodiments/aspects together with the accompanying drawings, of which:

FIG. 2b shows a side wall of a card reader according to A-A in FIG. 2a.

It should be added that the following description of the embodiments is for illustration purposes only and should not be interpreted as limiting the invention exclusively to these embodiments/aspects.

DETAILED DESCRIPTION

Embodiments of the present invention relate, in general, to the field of the field of electronic card readers, and more particularly, to a dual card reader for secure credit card payments using a mobile device, such as a mobile phone.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

FIGS. 1 to 6b show a card reader 1 for use with a mobile phone 10, which card reader 1 comprises a flat body 2; a chip card reader 6; a magnet stripe reader 7; and a connector 8. The card reader is, in contrast to a POS terminal, a simple card reader, adapted to read data from a card, e.g. a credit card, using the readers 6, 7, and send the data to a mobile device using the connector 8. The card reader also comprises an encryption circuit for encrypting the read data before sending it to the mobile device. Hence, in opposite to a POS terminal, the card reader is not a payment terminal adapted to execute a payment transaction.

Figure 1B:
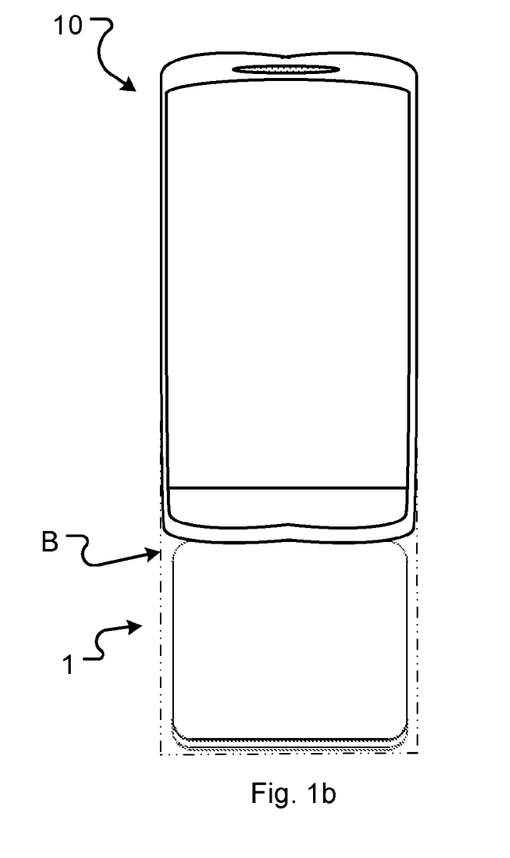
FIG. 1b shows a card reader being attached to a mobile phone.
Figure 2A:
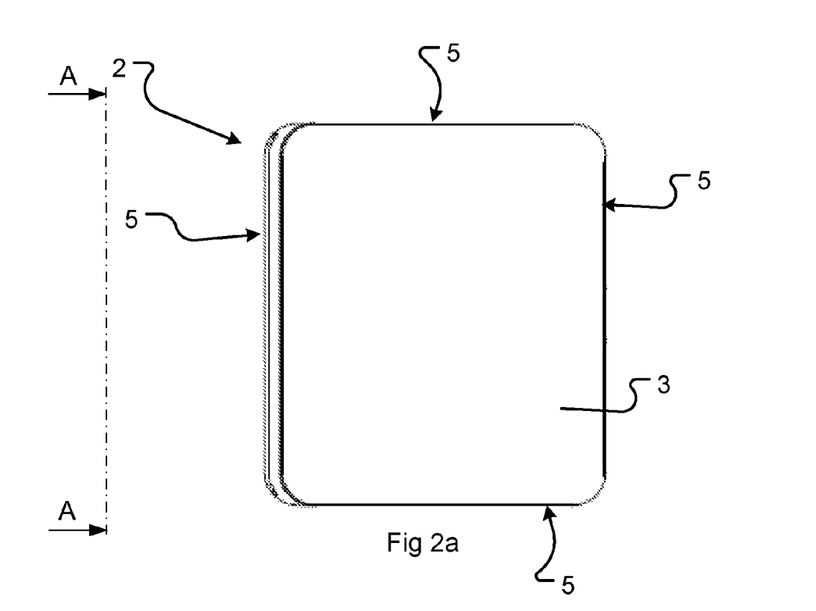
FIG. 2a shows a card reader seen from above.
Figure 2B:
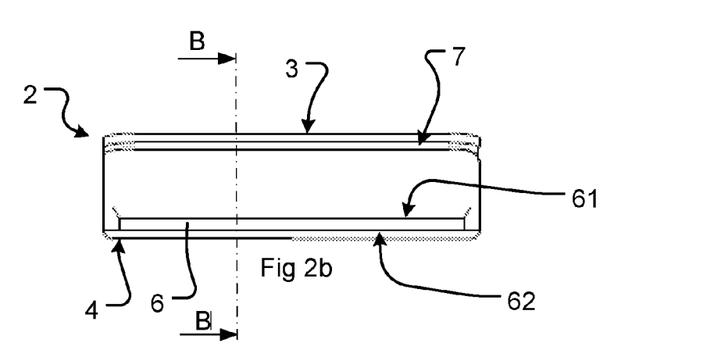

The flat body 2 comprises an upper side 3, a lower side 4 and at least one side wall 5. FIGS. 2a and 2b show these parts of the card reader 1, i.e. the upper side 3, the lower side 4 and the at least one side wall 5, which together define the enclosure or casing or boundary of the card reader 1. The flat body 2 of the card reader 1 is defined as having a height or thickness as shown in FIGS. 2b, 2c, 3c, 4c, 5b, and 6b being smaller, i.e. substantially smaller, than its width and length. The width of the body 2 typically corresponds to the width of a mobile phone. It is further desirable to make the card reader as thin as possible, even if it may not always be possible to make it as thin as the mobile phone. In general the overall dimensions of the card reader device are in the same range as the dimensions of the mobile phone. Though, the length may be considerably smaller, see FIG. 1b.

The card reader disclosed in FIG. 1-6 has four side walls with rounded corners. However, the card reader may as well have one circle shaped side wall, whereby the card reader will form a cylinder shape. According to another aspect of the invention the card reader has two curved side walls. The card reader may as well have any number of side walls and any number of curved or straight side walls or any combination of any such side walls.

Figure 1A:
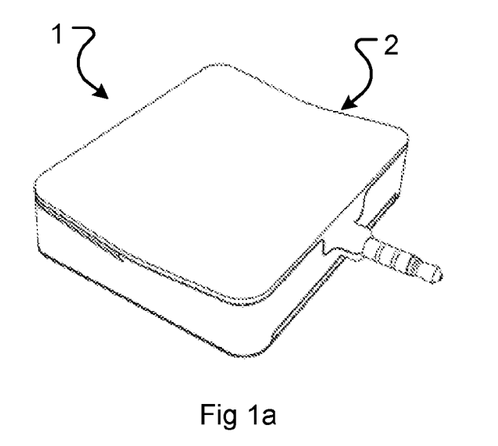
FIG. 1a shows a card reader for use with a mobile phone.

The connector 8 is adapted for connecting the card reader 1 to a mobile phone 10. FIGS. 2c to 5b show the connector 8 in dashed lines. In FIG. 1 the connector is a plug e.g. an audio plug as disclosed in FIGS. 1-5. However, the connector may as well be a socket or a wireless connector.

Figure 2C:
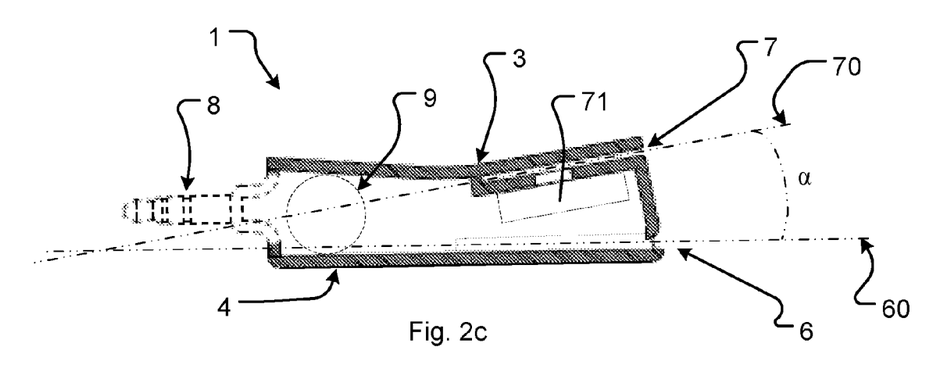
FIG. 2c shows a cross section of a card reader according to B-B in FIG. 2b.

The chip card reader 6 comprises an elongated opening in a side wall 5 of said card reader and is adapted to read a chip card, positioned in a first plane 60, in said opening. The elongated opening is configured to receive a chip card. The size of the opening corresponds to the outer dimensions of a chip card. FIGS. 2c, 5b and 6b show the first plane 60 in dash-dotted lines.

The magnet stripe reader 7 comprises a slot in a side wall 5 of the card reader, said slot being adapted to read a magnet stripe slid in the slot along a second plane 70; wherein the first plane and the second plane intersect. FIGS. 2c, 5b and 6b show the second plane 70 in dash-dotted lines.

The magnet stripe reader 7 is arranged closer to the upper side 3 of the card reader 1, i.e. closer to a user. The chip card reader 6 is arranged closer to the lower side 4 of the card reader 1. The magnet stripe reader 7 is arranged at the end of the card reader 1 where the upper side 3 is "bent-up" to place the slot of the magnet stripe reader 7 closer to a user, i.e. at a distance further from the bottom or underside, i.e. the outer surface of the lower side 4 of the card reader 1, compared to the opening of the chip card reader 6. This placing facilitates swiping of a card in the slot, because the slot faces the user, when the card reader is placed on a surface. Furthermore, this placing makes it possible to "hide" the magnet stripe reader. Then the chip card reader will be dominant to the user, which is desirable, because the chip card reader is often the preferred choice for use.

Figure 3A:
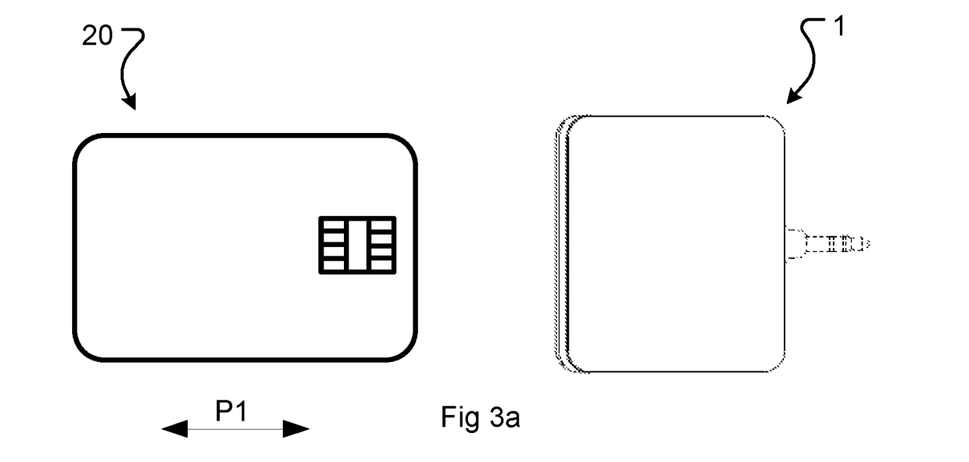
FIGS. 3a to 3c show the movement when inserting or extracting a chip card in a card reader.
Figure 3B:
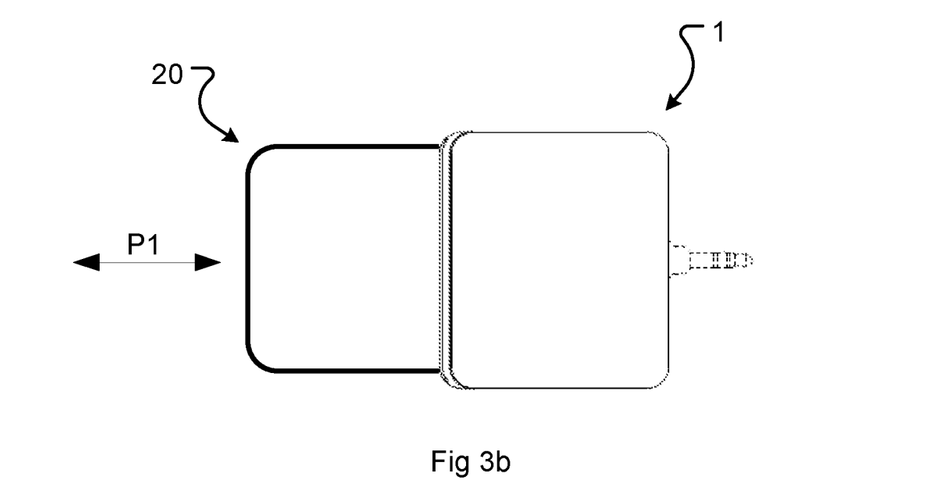
Figure 3C:
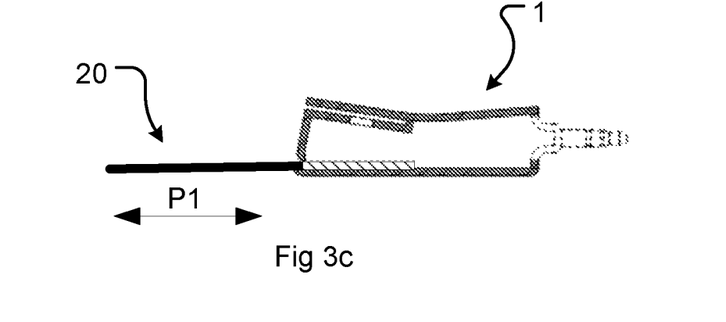
Figure 4A:
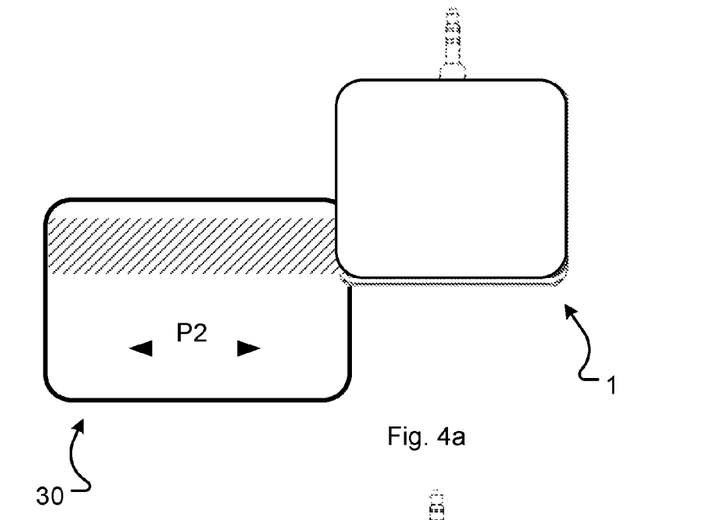
FIGS. 4a to 4b, illustrate sliding of a magnet stripe card in a card reader.
Figure 4B:
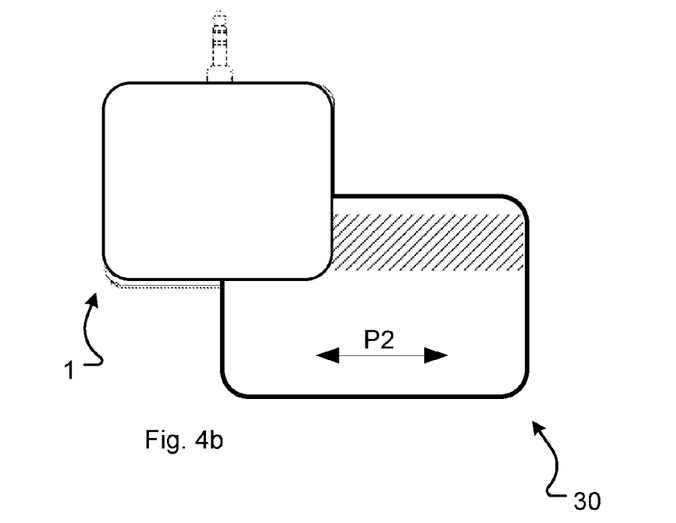
Figure 4C:
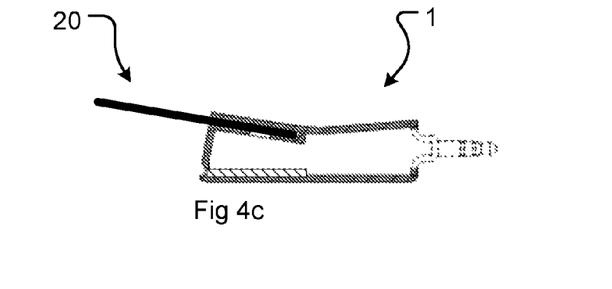

In FIGS. 3a to 3c and 4a to 4b, arrows P1 and P2 show the possible directions of movement when sliding in or out and introducing or extracting any smart card 20, 30 during use when viewing the card reader 1 from above or below. Arrows P1 and P2 illustrate the smart card 20, 30 movements for easy understanding of the use of the card reader 1 when viewing the faces of the upper side 3 and/or the lower side 4 of the card reader 1 in a viewing direction being angled in relation to the planes 6 and 7, for example in a viewing direction being perpendicular or close to perpendicular to the first plane 60 and/or the second plane 70 above. The directions and movements of the smart card 20 illustrated by arrows P1 occur along and in the first plane 60, i.e. in parallel with the first plane 60, as shown in FIGS. 3a-3c. The directions and movements of the smart card 30 illustrated by arrows P2 occur along and in the second plane 70, i.e. in parallel with the second plane 70, as shown in FIGS. 4a and 4b.

The card reader 1 is structured such that it comprises at least one chip card reader 6 and at least one magnet stripe reader 7, which readers are placed inside the flat body 2 of the card reading device (see FIGS. 2c, 3c, 4c, 5a, 5b, 6a, and 6b). The card readers 6 and 7 are contained within a boundary B of the flat card reading device's body 2. The card readers 6 and 7 are encapsulated by the flat card reader body 2 except for the exposed slot and openings in the side wall 5 enabling smart card accesses to the readers 6 and 7. Thereby protruding parts, which are prone to break, are avoided, e.g. when the card reader is carried around in a pocket.

Furthermore, because all the vital parts are contained within the flat body 2, it is easier to make it tamper proof or evident, because only the flat body 2 needs to be sealed. The boundary B may enclose or be defined by both the mobile phone 10 and the card reader 1, e.g. if the mobile phone and the card reader are operatively and physically, i.e. mechanically connected as shown in the plane of projection of FIG. 1b enclosing the outer contours, i.e. the widths and lengths of the device 1 and 10. The boundary B may enclose or be defined by only the width and/or length of the mobile phone 10 itself, e.g. if the mobile phone and the card reader are operatively connected by means of a wireless connection without a mechanical connection. The boundary B may be a separate boundary enclosing or defining only the width and/or length of the mobile phone 10. The boundary B may be a separate boundary for the card reading device enclosing or defining only the width and/or length of the card reader 1, e.g. if the mobile phone and the card reader are operatively connected by means of a wireless connection without a mechanical connection between them as shown in FIGS. 2a, 2b, 6a and 6b. The boundary B may be seen as the foot-print area of each single device 1 or 10 and/or the combined foot-print area of both devices when interconnected mechanically.

The chip card reader 6 and the magnet stripe reader 7 and their respective planes 60 and 70 are oriented/arranged in relation to each other so that the first plane 60 is in parallel with the extension plane of the chip card reader 6 and opening of the chip card reader 6 and the second plane 70 is in parallel with the extension plane of the magnet stripe reader 7 and its reader head 71 and its opening in the form of the slot of the magnet stripe reader 7.

The chip card reader 6 and the magnet stripe reader 7 and their respective planes 60 and 70 are not in parallel with each other. The first plane 60 of the chip card reader 6 is not in parallel with the second plane 70 of the magnet stripe reader 7. The extension plane and opening or orifice of the chip card reader 6 is not in parallel with the extension plane and opening area or orifice of the slot of the magnet stripe reader 7.

The chip card reader 6 and the magnet stripe reader 7 and their respective planes 60 and 70 are therefore angled in relation to each other. The chip card reader 6 and the magnet stripe reader 7 extend in different planes 60 and 70, which planes are inclined in relation to each other. The chip card reader plane 60 and the magnet stripe reader plane 70 extend in different directions, which directions may be diverging or converging directions. The chip card reader plane 60 and the magnet stripe reader plane 70 thereby intersect.

According to one aspect of the invention an angle α between the first and the second plane is 9 degrees, which may be one suitable angle in order to make room for a normal sized magnet stripe reader 71 in between the planes where the distance and space is largest. According to one aspect of the invention the angle is adapted such that a user may swipe a credit card in the magnet stripe reader 7, when the card reader is positioned on a flat surface.

According to one aspect of the invention the angle α between the first and the second plane is between 7 and 11 degrees. According to another aspect of the invention the angle α between the first and the second plane is between 4 and 14 degrees.

In FIG. 1a, the card reading device 1 is shown separately as one unit with its flat body 2 in a perspective view. The flat body 2 has a symmetrical box-shape, which box is flat with a rounded shape. The rounded box-shape of the flat body 2 may be realized in a cylinder-shape with a small length or height, depending on its orientation, i.e. similar to the shape of an ice hockey puck, but of course not a solid puck. The card reader 1 may alternatively have a substantially or fully parallelepipedic shape, e.g. a square or rectangular shape with rounded corners as shown in FIGS. 1a, 2a, and 2b.

The card reader 1 according to one aspect may have its upper side 3 curved as shown in FIGS. 1a, 2c, 3c, 4c, 5b, and 6b. In another aspect of the card reader 1 the upper side 3 of the card reader has a U-shape (see also FIGS. 1a, 2c, 3c, 4c, 5b, and 6b). Yet another aspect of a card reader 1 has an upper side 3 being planoconcave, i.e. its upper side 3 is concave and its lower side 4 is plane.

This curved upper side 3 of the card reader 1 is shown in FIG. 2c with the chip card reader 6 and the magnet stripe reader 7 arranged to the right and to the left in FIG. 3c inside the card reader at one of its ends, if the card reader is parallelepipedic. The card reader 1 has a shape that is thicker at a first end with readers 6 and/or 7 and thinner at the other, opposite and second end.

The shape of the upper side 3 makes the body 2 "bend-up" by being slightly curved upwards, i.e. away from the extension plane of the card reader, at the first end with the magnet stripe reader 7. The other end of the card reader 1 may be straight by extending horizontally but may also be slightly bent upwards, but not as much as the first end with the magnet stripe reader 7 to achieve a lower height of the card reader 1 closer to the connector 8.

In FIG. 6b, the chip card reader 6 is not arranged at the same side or end as the magnet stripe reader 7, i.e. the chip card reader 6 is placed at the other end of the car reader device 1 compared to the card reader in FIG. 2c.

In FIGS. 1a, 2c, 3a, 3b, 4a, 4b, 4c, 5a and 5b, one aspect of the card reader 1 has its connector 8 positioned on a side wall 5 of said card reader. Here, the elongated opening of the chip card reader 6 and the slot of the magnet stripe reader 7 are positioned on the opposite side of the card reader 1. The slot of the magnet stripe reader 7 is elongated. Hence, it is possible to swipe a magnet stripe card, when the card reader is physically connected to a mobile device, independently of the size of the card reader. The placing avoids the mobile device hindering any movement of a magnet stripe card along the slot.

The card reader 1 has its elongated opening of the chip card reader 6 arranged lengthwise in a substantially parallel direction or extending in parallel with the elongated slot of the magnet stripe reader 7. This means that the chip card reader 6 has at least one of its elongated edges 61, 62 around the chip card reader opening arranged in a substantially parallel direction or extending in parallel with the elongated slot of the magnet stripe reader 7. This parallelism of the extension length of the opening of the chip card reader 6 and the slot of the magnet stripe reader 7 is achieved even though the extension planes 60 and 70 of each reader 6 and 7 are not in parallel with each other.

In FIGS. 2c, 3c, 4c and 5b, one aspect of the card reader 1, has the elongated opening of its chip card reader 6 and the slot of the magnet stripe reader 7 positioned on top of each other. In one aspect of the card reader 1, the elongated opening of the chip card reader 6 and the slot of the magnet stripe reader 7 coincide to a substantial extent or coincide fully in a direction being substantially in parallel or in parallel with the side wall 5 of the card reader. The card reader 1 in one aspect has its elongated opening of chip card reader 6 arranged further away from the connector 8, as measured along the extension plane of the lower side 4 of the card reader, than the slot of the magnet stripe reader 7. In one aspect of the card reader 1, the side wall 5 of the card reader, at which side wall the slot of the magnet stripe reader 7 is placed, extends in a direction not being perpendicular to the plane of the lower side 4 of the card reader. In one aspect, the side wall 5 of the card reader, at which side wall the slot of the magnet stripe reader 7 is placed, extends in an angle being different from the angle of the normal or the normal axis to the plane of the lower side 4 of the card reader. Then, this side wall 5 with the slot of the magnet stripe reader 7 leans towards the card reader 1 and its connector 8 and exposes the slot of the magnet stripe reader 7 in an inclined surface facing upwards, at least somewhat upwards, and exposing and displaying the slot in an easy accessible way towards a user of the card reader 1.

In FIGS. 2c, 3c, 4c, 5b, and 6b, one aspect of the card reader 1 is shown where the lower side 4 of the card reader is flat. The lower side 4 of the card reading device 1 extends straight. The lower side 4 forms an unbent, even and plane smooth surface that is adapted to give a steady and stable base for the card reader to be supported at several contact points or contact areas when the card reader is put on a surface with its lower side 4 facing downwards for use or when not to be used.

According to one aspect of the invention the card reader is covered with a rugged material e.g. rubber or soft paint. Such a material will prevent the card reader from sliding, when used lying on a surface. The material also makes the card reader easy to grip.

In a card reader 1 similar to the one above, the first plane 60 and the second plane 70 intersects within the boundary of the card reader 1. This is shown in FIGS. 5b and 6b. The first plane 60 and the second plane 70 defining the extension planes of the chip card reader 6 and the magnet stripe reader 7, respectively, are arranged inside the card reader 1 such that the angle α is defined between the planes 60 and 70. In FIGS. 5b and 6b, the angle α is such that the planes 60 and 70 being inclined in relation to each other intersect within the boundary B of the card reader 1.

FIG. 2c showing another card reader 1, the angle α is such that the planes 60 and 70 being inclined in relation to each other do not intersect within the boundary B of the card reader 1.

In FIG. 1b, the card reader 1 has the planes 60 and 70 intersecting within the boundary of the mobile phone 10, when the card reader is physically connected to the mobile phone. Here, the angle α is such that the planes 60 and 70 being inclined in relation to each other intersect within the boundary B of the mobile phone 10.

The magnet stripe reader 7 further comprises a magnet stripe reader head 71, see FIG. 2c. The magnet stripe reader head 71 is a bulky component. The magnet stripe reader head 71 is positioned between the chip card reader 6 and the magnet stripe reader 7, where the space and the distance between the chip card reader and the magnet stripe reader 7 is the utmost. Thereby, the size of the card reader may be optimized and kept minimal.

The card reader further comprises a battery 9 exchangeable through an opening in the card reader 1, not shown. The opening may e.g. be positioned in the bottom of the card reader. The battery is positioned in the part of the card reader opposite the readers 6, 7. The battery is positioned in the part of the card reader opposite the readers and closest to the connector 8. The upper side 3 may then be curved between the magnet stripe reader head 71 and the battery 9. Hence, the thinnest part of the card reader 1 is positioned between the chip card reader 6 and the battery 9. The thinnest part of the card reader is alternatively positioned between the magnet stripe reader head 71 and the battery 9. The thinnest part of the card reader is alternatively positioned at a middle portion of the card reader 1 forming a waistline-like shape of the upper side 3 of the card reader when viewed from the side wall 5 not equipped with any connector 8 or any slot of the magnet stripe reader 7 (see FIGS. 2c, 3c, 4c, 5b and 6b).

Figure 5A:
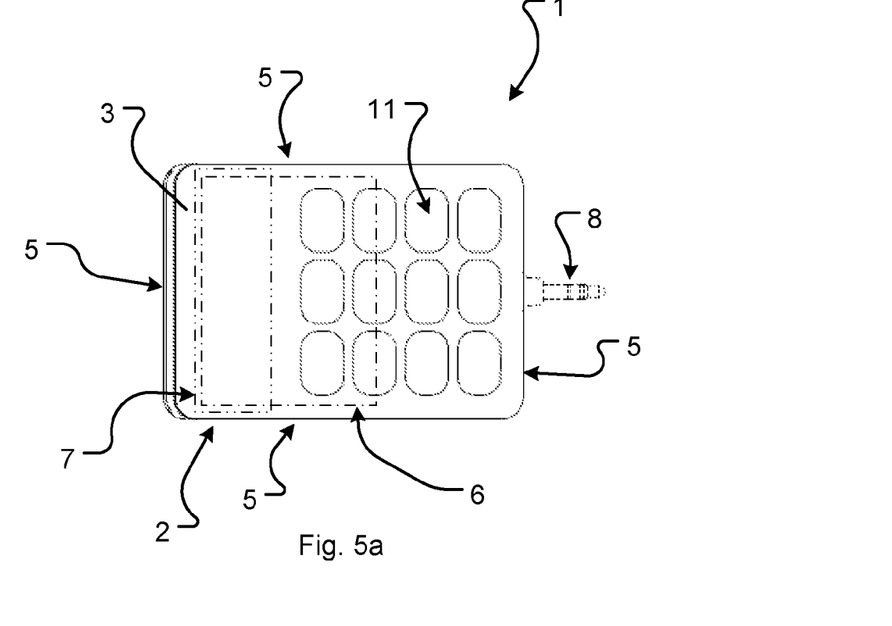
FIG. 5a shows a card reader comprising a key board seen from above.
Figure 5B:
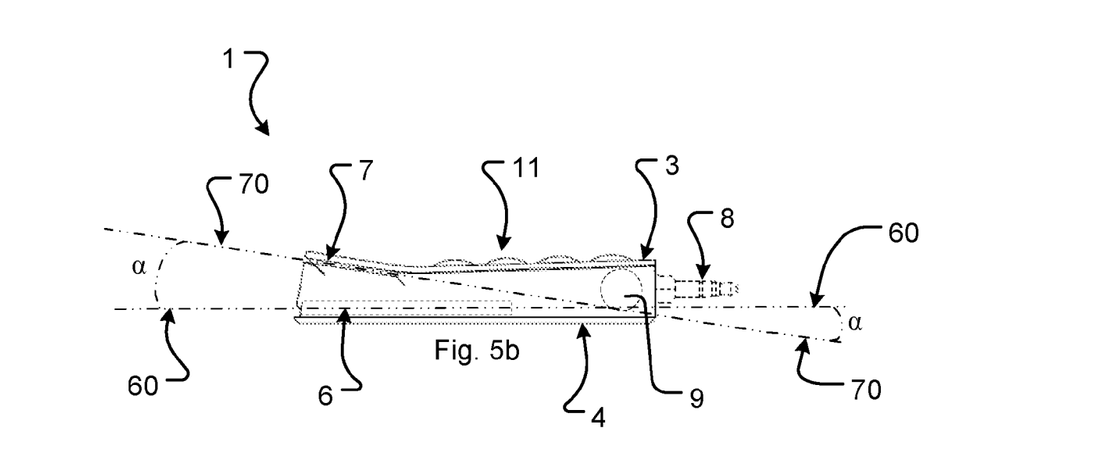
FIG. 5b shows a side wall of a card reader comprising a key board.

FIG. 5 discloses another aspect of the invention. The card reader 1 disclosed in FIG. 5 differs from the card reader disclosed in FIGS. 1-4 in that it comprises a keyboard 11 for entering e.g. a PIN code. The dimensions of the card reader 1 are also different. However, the readers 6, 7 are configured and used as already disclosed in FIGS. 1-4.

Figure 6A:
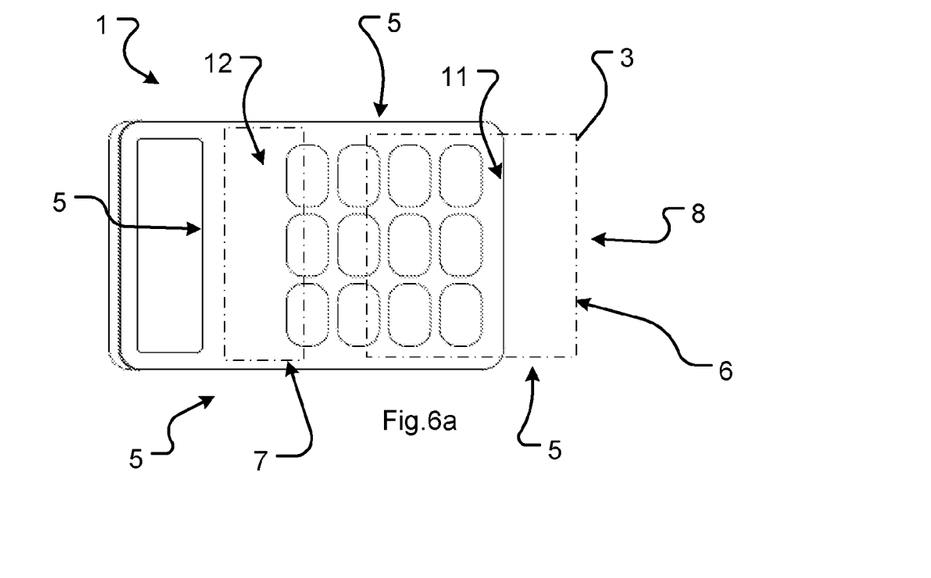
FIGS. 6a and 6b show a card reader comprising a keyboard a display and a wireless connector.
Figure 6B:
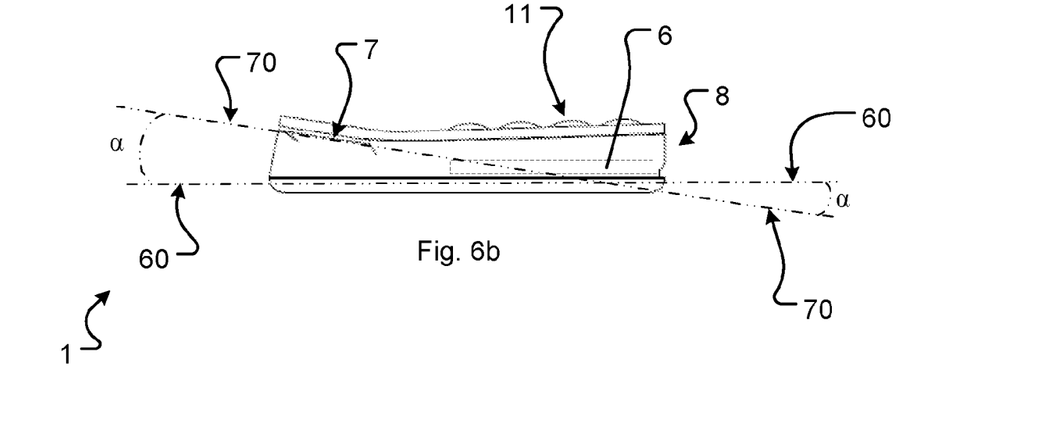

FIG. 6 discloses another aspect of the invention. The card reader 1 disclosed in FIG. 6 differs from the card reader disclosed in FIGS. 1-5 in that it comprises a wireless connector. Furthermore, the magnet stripe reader 7 is positioned at the opposite side of the card reader as the chip card reader 6. Furthermore, the card reader comprises a keyboard 11 and a display 12. The key board 11 is positioned on the upper side of the card reader. However, the display and/or the key board may as well be positioned on the lower side 4 of the card reader.

In FIGS. 5a and 6a, the readers 6 and 7 are shown in dash-dotted lines for clearly showing their mutual positions in relation to each other but also in relation to the different parts of the card reading device 1.

The invention claimed is:

1. A card reader for use with a mobile phone comprising:
   a flat body comprising an upper side, a lower side and at least one side wall together defining a housing of the card reader;
   a connector for connecting the card reader to a mobile phone;
   a chip card reader, comprising an elongated opening in a side wall of said card reader, adapted to read a chip card, positioned in a first plane, in said opening; and
   a magnet stripe reader comprising a slot in a side wall of the card reader, said slot being adapted to read a magnet stripe slid in the slot along a second plane; wherein the first plane and the second plane intersect; and
   wherein the elongated opening of said chip card reader and the slot of the magnet stripe reader are positioned on top of each other.

2. A card reader according to claim 1, wherein the first plane and the second plane intersect within the boundary of the card reader.

3. A card reader according to claim 1, wherein the planes intersect within the boundary of the mobile phone, when the card reader is physically connected to a mobile phone.

4. A card reader according to claim 1, wherein upper side of the card reader is curved.

5. A card reader according to claim 4, wherein upper side of the card reader has a U-shape.

6. A card reader according to claim 1, wherein lower side of the card reader is flat.

7. A card reader according to claim 1, wherein the connector is positioned on a side wall of said card reader, wherein the elongated opening of said chip card reader and the slot of the magnet stripe reader are positioned on the opposite side of the card reader.

8. A card reader for use with a mobile phone comprising:
a flat body comprising an upper side, a lower side and at least one side wall together defining a housing of the card reader;
a connector for connecting the card reader to a mobile phone;
a chip card reader, comprising an elongated opening in a side wall of said card reader, adapted to read a chip card, positioned in a first plane, in said opening; and
a magnet stripe reader comprising a slot in a side wall of the card reader, said slot being adapted to read a magnet stripe slid in the slot along a second plane; wherein the first plane and the second plane intersect;
wherein the elongated opening of said chip card reader and the slot of the magnet stripe reader are positioned on top of each other; and
a magnet stripe reader head positioned between the chip card reader and the magnet stripe reader.

9. A card reader according to claim 1, further comprising a display.

10. A card reader according to claim 1, further comprising a key board.

11. A card reader according to claim 1, wherein the key board is positioned on the upper side of the card reader.

12. A card reader according to claim 1, wherein the angle between the first and the second plane is between 7 and 11 degrees.

13. A card reader according to claim 1, wherein the angle between the first and the second plane is between 4 and 14 degrees.

14. A card reader according to claim 1, wherein the connector is a plug.

15. A card reader according to claim 1, wherein the connector is a wireless connector.

16. A card reader for use with a mobile phone comprising:
a flat body comprising an upper side, a lower side and at least one side wall together defining a housing of the card reader;
a connector for connecting the card reader to a mobile phone;
a chip card reader, comprising an elongated opening in a side wall of said card reader, adapted to read a chip card, positioned in a first plane, in said opening; and
a magnet stripe reader comprising a slot in a side wall of the card reader, said slot being adapted to read a magnet stripe slid in the slot along a second plane; wherein the first plane and the second plane intersect; and
wherein the magnet stripe reader is positioned in the opposite side of the card reader as the chip card reader.

17. A card reader according to claim 16, wherein the thinnest part of the card reader is positioned between the magnet stripe reader head and the battery.

18. A card reader according to claim 16, wherein the thinnest part of the card reader is positioned between the chip card reader and the battery.

19. A card reader for use with a mobile phone comprising:
a flat body comprising an upper side, a lower side and at least one side wall together defining a housing of the card reader;
a connector for connecting the card reader to a mobile phone;
a chip card reader, comprising an elongated opening in a side wall of said card reader, adapted to read a chip card, positioned in a first plane, in said opening;
a magnet stripe reader comprising a slot in a side wall of the card reader, said slot being adapted to read a magnet stripe slid in the slot along a second plane; wherein the first plane and the second plane intersect; and
a battery exchangeable through an opening in the card reader.

* * * * *